(12) United States Patent
Lee et al.

(10) Patent No.: US 10,091,599 B2
(45) Date of Patent: Oct. 2, 2018

(54) PORTABLE TERMINAL, HEARING AID, AND METHOD OF INDICATING POSITIONS OF SOUND SOURCES IN THE PORTABLE TERMINAL

(71) Applicant: Samsung Electronics Co., Ltd., Suwon-si, Gyeonggi-do (KR)

(72) Inventors: Won-Gi Lee, Suwon-si (KR); Ik-Soo Kim, Seoul (KR); Young-Joon Oh, Seoul (KR); Yang-Wook Kim, Hwaseong-si (KR); Jung-Hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/278,549

(22) Filed: Sep. 28, 2016

(65) Prior Publication Data

US 2017/0019745 A1    Jan. 19, 2017

Related U.S. Application Data

(63) Continuation of application No. 14/068,443, filed on Oct. 31, 2013, now Pat. No. 9,467,786.

(30) Foreign Application Priority Data

Mar. 28, 2013   (KR) ........................ 10-2013-0033283

(51) Int. Cl.
*H04R 25/00* (2006.01)
*H04R 29/00* (2006.01)
(Continued)

(52) U.S. Cl.
CPC .......... *H04R 29/008* (2013.01); *G06F 3/165* (2013.01); *H04R 1/326* (2013.01); *H04R 3/005* (2013.01);
(Continued)

(58) Field of Classification Search
CPC ............. G06F 3/04883; G06F 3/0488; G06F 3/04886; G06F 3/0482; G06F 3/04847;
(Continued)

(56) References Cited

U.S. PATENT DOCUMENTS

2003/0138109 A1   7/2003  Bindner et al.
2008/0192969 A1   8/2008  Welner
(Continued)

FOREIGN PATENT DOCUMENTS

CN     102573542 A     7/2012
JP     2009-021764     1/2009
(Continued)

OTHER PUBLICATIONS

Anonymous, SWAN System to Help Blind Navigate Environment, Georgia Institute of Technology, http://sonify.psych.gatech.edu/presscoverage/2006/georgiatechnewsroom-2006-08-15-swan.pdf.

*Primary Examiner* — Akelaw Teshale
(74) *Attorney, Agent, or Firm* — Jefferson IP Law, LLP

(57) ABSTRACT

A portable terminal, a hearing aid, and a method of indicating the position of a sound source in the portable terminal are provided. The method includes receiving sound signals of a plurality of sound sources, determining respective distances between the plurality of sound sources and the portable terminal, and respective directions of the plurality of sound sources from the portable terminal, based on the received sound signals of the plurality of sound sources, determining positions of the plurality of sound sources on the touch screen based on the determined distances and directions of the plurality of sound sources, and displaying the determined positions of the plurality of sound sources on the touch screen.

16 Claims, 12 Drawing Sheets

(51) Int. Cl.
*H04R 3/00* (2006.01)
*G06F 3/16* (2006.01)
*H04R 1/32* (2006.01)
*H04S 7/00* (2006.01)
*G06F 3/0484* (2013.01)
*G06F 3/0488* (2013.01)

(52) U.S. Cl.
CPC ......... *H04R 25/558* (2013.01); *G06F 3/0488* (2013.01); *G06F 3/04842* (2013.01); *H04R 25/554* (2013.01); *H04R 2499/11* (2013.01); *H04S 7/30* (2013.01); *H04S 2400/11* (2013.01); *H04S 2400/15* (2013.01)

(58) Field of Classification Search
CPC ........... G06F 2203/04808; G06F 3/016; G06F 3/04842; G06F 3/167; G06F 3/0486; G06F 3/0233; G06F 3/04817; G06F 3/0484; G06F 3/0416; G06F 3/04845; H04R 1/08; H04R 1/406; H04R 3/005; H04R 5/033
USPC ........... 381/104, 109, 124, 94.1, 98, 353, 92
See application file for complete search history.

(56) References Cited

U.S. PATENT DOCUMENTS

| | | |
|---|---|---|
| 2009/0015651 A1 | 1/2009 | Togami et al. |
| 2009/0097360 A1 | 4/2009 | Jeong et al. |
| 2009/0164905 A1* | 6/2009 | Ko ................... H04M 1/6016 715/727 |
| 2010/0104106 A1 | 4/2010 | Son et al. |
| 2010/0332226 A1* | 12/2010 | Lee ................... G06F 17/30265 704/235 |
| 2011/0013075 A1* | 1/2011 | Kim ................... H04N 5/602 348/370 |
| 2011/0029920 A1 | 2/2011 | Kang |
| 2011/0075860 A1 | 3/2011 | Nakagawa et al. |
| 2011/0080356 A1* | 4/2011 | Kang ................... G06F 3/0486 345/173 |
| 2011/0106375 A1 | 5/2011 | Gurusamy Sundaram |
| 2011/0191692 A1 | 8/2011 | Walsh et al. |
| 2011/0268418 A1 | 11/2011 | Jones et al. |
| 2011/0279384 A1 | 11/2011 | Miller et al. |
| 2012/0020503 A1 | 1/2012 | Endo et al. |
| 2012/0121103 A1 | 5/2012 | Cohen et al. |
| 2013/0176250 A1* | 7/2013 | Lee ................... G06F 3/013 345/173 |
| 2013/0251159 A1 | 9/2013 | Buck et al. |
| 2013/0289983 A1* | 10/2013 | Park ................... G10L 15/26 704/235 |
| 2014/0104206 A1 | 4/2014 | Anderson |
| 2014/0132531 A1* | 5/2014 | Lee ................... G06F 3/01 345/173 |
| 2014/0225821 A1* | 8/2014 | Kim ................... H04M 1/236 345/156 |
| 2015/0062443 A1* | 3/2015 | Na ................... G08C 17/02 348/734 |
| 2015/0186109 A1* | 7/2015 | Jarvinen ................... G06F 3/167 715/728 |

FOREIGN PATENT DOCUMENTS

| | | |
|---|---|---|
| KR | 10-2006-0043757 A | 5/2006 |
| KR | 20-2009-0000500 U | 1/2009 |
| KR | 10-2009-0038652 A | 4/2009 |
| KR | 10-2010-0044991 A | 5/2010 |
| KR | 20-2010-0011726 U | 12/2010 |
| KR | 10-2011-0109620 A | 10/2011 |
| KR | 10-2011-0121304 A | 11/2011 |
| KR | 10-2012-0082087 A | 7/2012 |

* cited by examiner

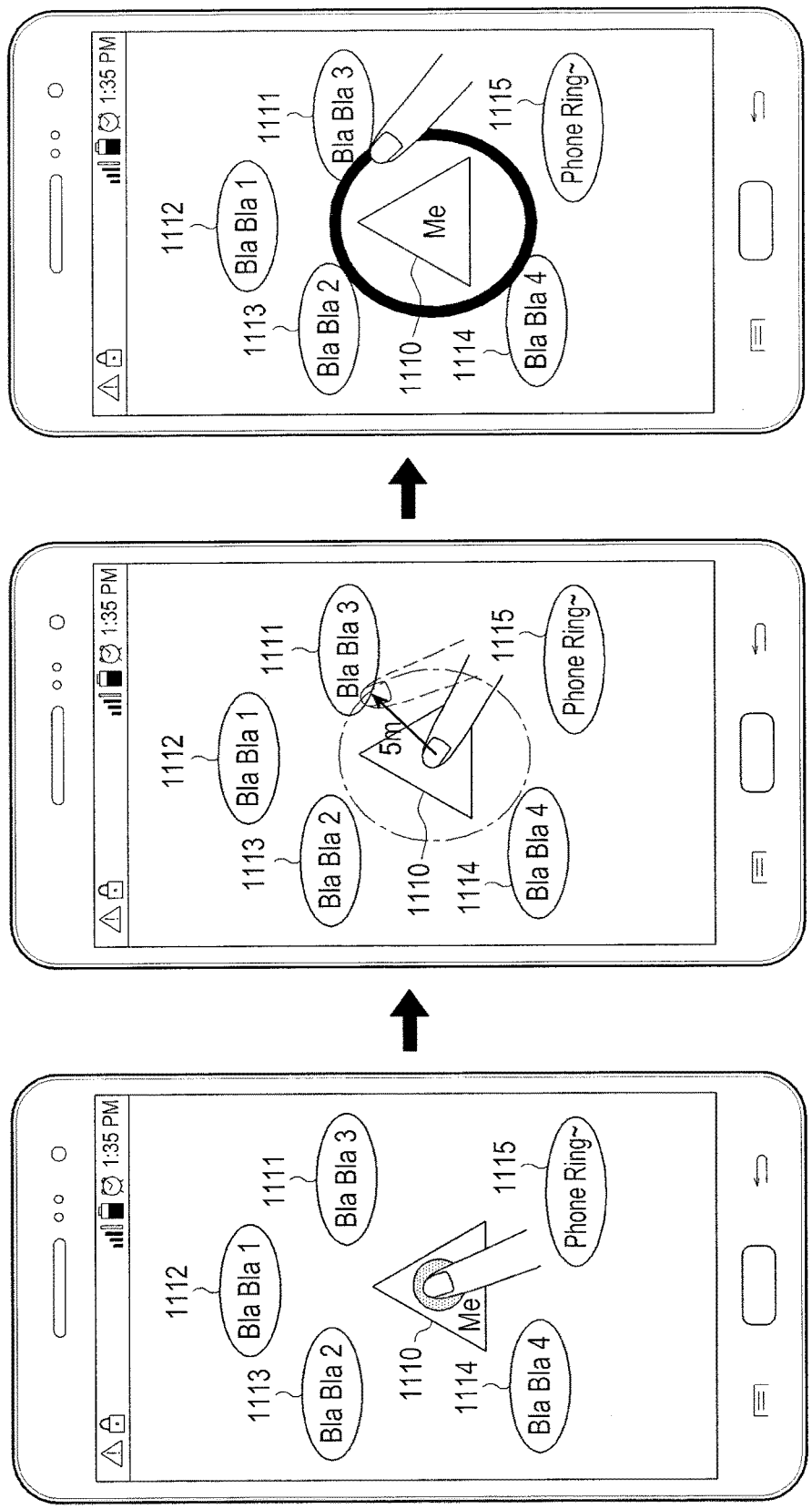

PORTABLE TERMINAL, HEARING AID, AND METHOD OF INDICATING POSITIONS OF SOUND SOURCES IN THE PORTABLE TERMINAL

CROSS-REFERENCE TO RELATED APPLICATION(S)

This application is a continuation application of prior application Ser. No. 14/068,443, filed on Oct. 31, 2013, which will issue as U.S. Pat. No. 9,467,786 on Oct. 11, 2016 and claimed the benefit under 35 U.S.C. § 119(a) of a Korean patent application filed on Mar. 28, 2013 in the Korean Intellectual Property Office and assigned Serial No. 10-2013-0033283, the entire disclosure of which is hereby incorporated by reference.

TECHNICAL FIELD

The present disclosure relates to a portable terminal, a hearing aid, and a method of indicating the positions of sound sources.

BACKGROUND

Terminals such as smart phones, portable phones, and tablet Personal Computers (PCs) have recently provided a wider range of services and additional functions. According to the related art, a terminal is equipped with a camera, a microphone, a speaker, a display, a wireless communication module, and sensors. Accordingly, the terminal provides many functions in order to satisfy various users' demands.

Particularly, the terminal may provide a variety of Graphical User Interfaces (GUIs) using the display. If sound sources can be visualized on the display and controlled, the hearing-impaired as well as ordinary users will benefit from the terminal.

For example, if the terminal provides a function of detecting adjacent sound sources and displaying the positions of the sound sources, the hearing-impaired as well as the ordinary users may use the terminal more conveniently.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a portable terminal which detects adjacent sound sources and indicates the positions of the sound sources, a hearing aid, and a method of indicating the positions of sound sources.

Another aspect of the present disclosure is to provide a portable terminal which enables a user to detect the positions of sound sources and selectively hear an intended sound source, a hearing aid, and a method of indicating the positions of sound sources.

Another aspect of the present disclosure is to provide a portable terminal which enables a user to select the direction, range, distance, or position of an intended sound source by various gestures and outputs a sound of the selected sound source, a hearing aid, and a method of indicating the positions of sound sources.

In accordance with an aspect of the present disclosure, a method of indicating the position of a sound source in a portable terminal having a touch screen is provided. The method includes receiving sound signals of a plurality of sound sources, determining respective distances between the plurality of sound sources and the portable terminal, and respective directions of the plurality of sound sources from the portable terminal, based on the received sound signals of the plurality of sound sources, determining positions of the plurality of sound sources on the touch screen based on the determined distances and directions of the plurality of sound sources, and displaying the determined positions of the plurality of sound sources on the touch screen.

In accordance with another aspect of the present disclosure, a method of outputting a sound in a hearing aid is provided. The method includes receiving a sound signal of a sound source from the portable terminal, the sound source being selected and having a controlled volume in response to a user gesture on a touch screen of the portable terminal, and outputting the received sound signal of the selected sound source according to the controlled volume.

In accordance with another aspect of the present disclosure, a portable terminal having a touch screen is provided. The portable terminal includes a touch screen configured to display positions of a plurality of sound sources, and a controller configured to determine respective distances between the plurality of sound sources and the portable terminal, and respective directions of the plurality of sound sources from the portable terminal, based on the received sound signals of the plurality of sound sources, to determine the positions of the plurality of sound sources on the touch screen based on the determined distances and directions of the plurality of sound sources, and to control display of the determined positions of the plurality of sound sources on the touch screen.

In accordance with another aspect of the present disclosure, a hearing aid is provided. The hearing aid includes a wireless unit configured to receive a sound signal of a sound source from the portable terminal, the sound source being selected and having a controlled volume in response to a user gesture on a touch screen of the portable terminal, and an output unit configured to output the received sound signal of the selected sound source according to the controlled volume.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 11A, 11B, and 11C illustrate a user gesture input indicating a sound source-selection distance according to an embodiment of the present disclosure;

Throughout the drawings, like reference numerals will be understood to refer to like parts, components, and structures.

DETAILED DESCRIPTION

Figure 1:
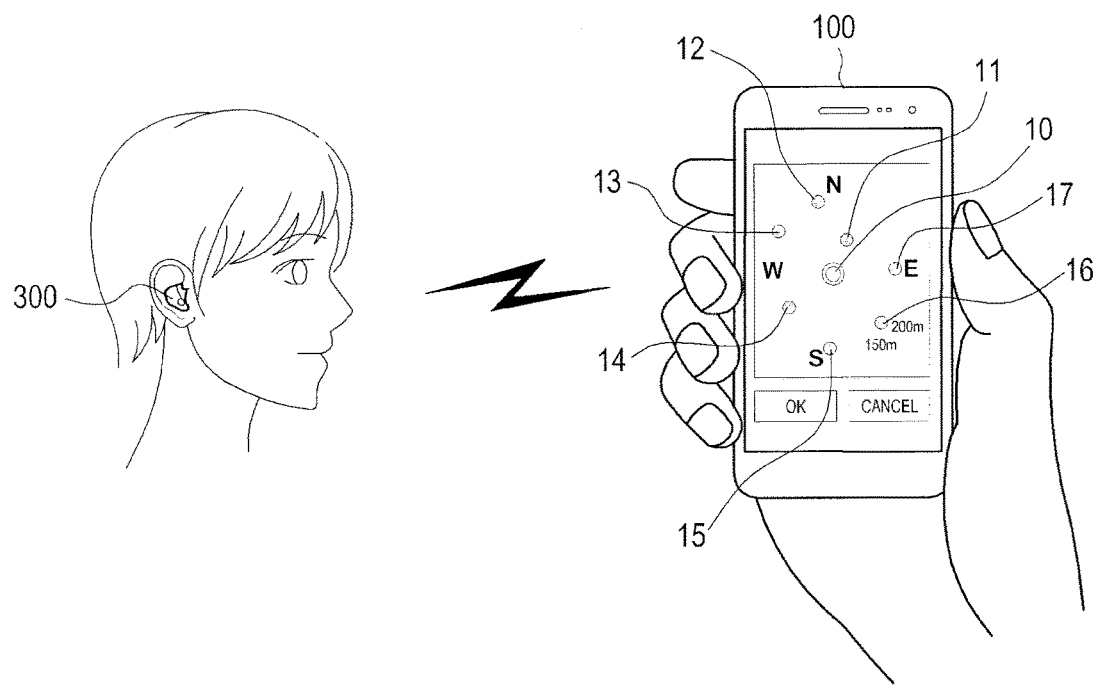
FIG. 1 illustrates operations of a terminal and a sound output device according to an embodiment of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure will be provided to achieve the above-described technical aspects of the present disclosure. In an implementation, defined entities may have the same names, to which the present disclosure is not limited. Thus, various embodiments of the present disclosure can be implemented with same or ready modifications in a system having a similar technical background.

Through the description, 'user gesture input' corresponds to an input that a user creates by making a gesture on a touch screen (e.g., in order to control a terminal). For example, user gesture inputs may include a touch, a touch and hold, a drag, a flick, a hold, and the like.

'Touch' corresponds to a gesture of touching a screen with a finger or a touch input unit such as a stylus, a pen, or the like. Specifically, a touch has a preset touch time defined as the difference between a touch-in time when a finger or the touch input unit touches the screen and a touch-out time when the finger or the touch input unit is removed from the screen.

'Touch and hold' corresponds to a gesture including a touching of a screen with a finger or the touch input unit and keeping the touch of the screen for a predetermined threshold time or longer. The touch and hold has a time difference equal to or larger than a threshold. For example, if the difference between a touch-in time and a touch-out time is greater than or equal to the threshold, then the gesture is determined to correspond to a touch and hold. To indicate whether a touch input is touch or touch and hold, if the touch input is kept for a threshold time or longer, a visual or acoustic feedback signal may be provided to a user.

'Drag' corresponds to a gesture of touching a screen with a finger or the touch input unit and moving the touch to another position of the screen without detaching the finger or the touch input from the screen.

'Flick' corresponds to a gesture of fast dragging a finger or the touch input unit across a screen. A drag and a flick may be distinguished from each other depending on whether the user moves a finger or the touch input unit at a threshold speed or faster.

'Hold' corresponds to a gesture of keeping a touch of a finger or the touch input unit at a specific point of a screen for a threshold time or longer without detaching the finger or the touch input unit from the screen. The hold gesture lasts at a specific point for a threshold time or longer between a touch-in time and a touch-out time.

FIG. 1 illustrates operations of a terminal and a sound output device according to an embodiment of the present disclosure.

Referring to FIG. 1, a terminal 100 may be a portable terminal. The terminal 100 may locate one or more sound sources around the terminal 100 (or a user) and display a terminal image 10 representing the terminal 100 and sound source images 11 to 17 representing the sound sources at the corresponding positions of the sound sources with respect to the terminal 100.

A sound source refers to a source or its equivalent from which a sound is emitted. For example, sound sources may include a person that speaks, a player that performs music, a speaker that outputs music, a phone that rings, and the like. Besides, any other source that outputs a sound may be a sound source.

The terminal 100 may select the sound source image of a sound source to emit a sound according to a user gesture input from among the sound source images 11 to 17, and may output a sound of the selected sound source. In addition, the terminal 100 may provide the sound of the selected sound source to a sound output device 300 (e.g., a hearing aid, an ear-microphone, a headset, or the like).

The terminal 100 may select at least one volume level for a sound source from among a plurality of preset volume levels according to a user gesture input and output a sound of the sound source at the selected volume level. The terminal 100 may also output the sound of the selected sound source at the selected volume level to the sound output device 300.

The sound output device 300 may be a device that outputs a sound, such as a hearing aid, an ear-microphone, a headset, or the like. Various embodiments of the present disclosure will be described in the context of a hearing aid being used as the sound output device 300, by way of example. The hearing aid 300 may receive sound signals of one or more sound sources through microphones, amplify the sound signals, and output the amplified sound signals audibly to a user through a speaker.

The hearing aid 300 may communicate with the terminal 100 wirelessly or wiredly and may receive a sound of a sound source selected from among one or more sound sources from the terminal 100 and output the received sound. The hearing aid 300 may receive a sound of a sound source with a volume controlled to a volume level selected by the terminal 100 and output the received volume-controlled sound.

Figure 2:
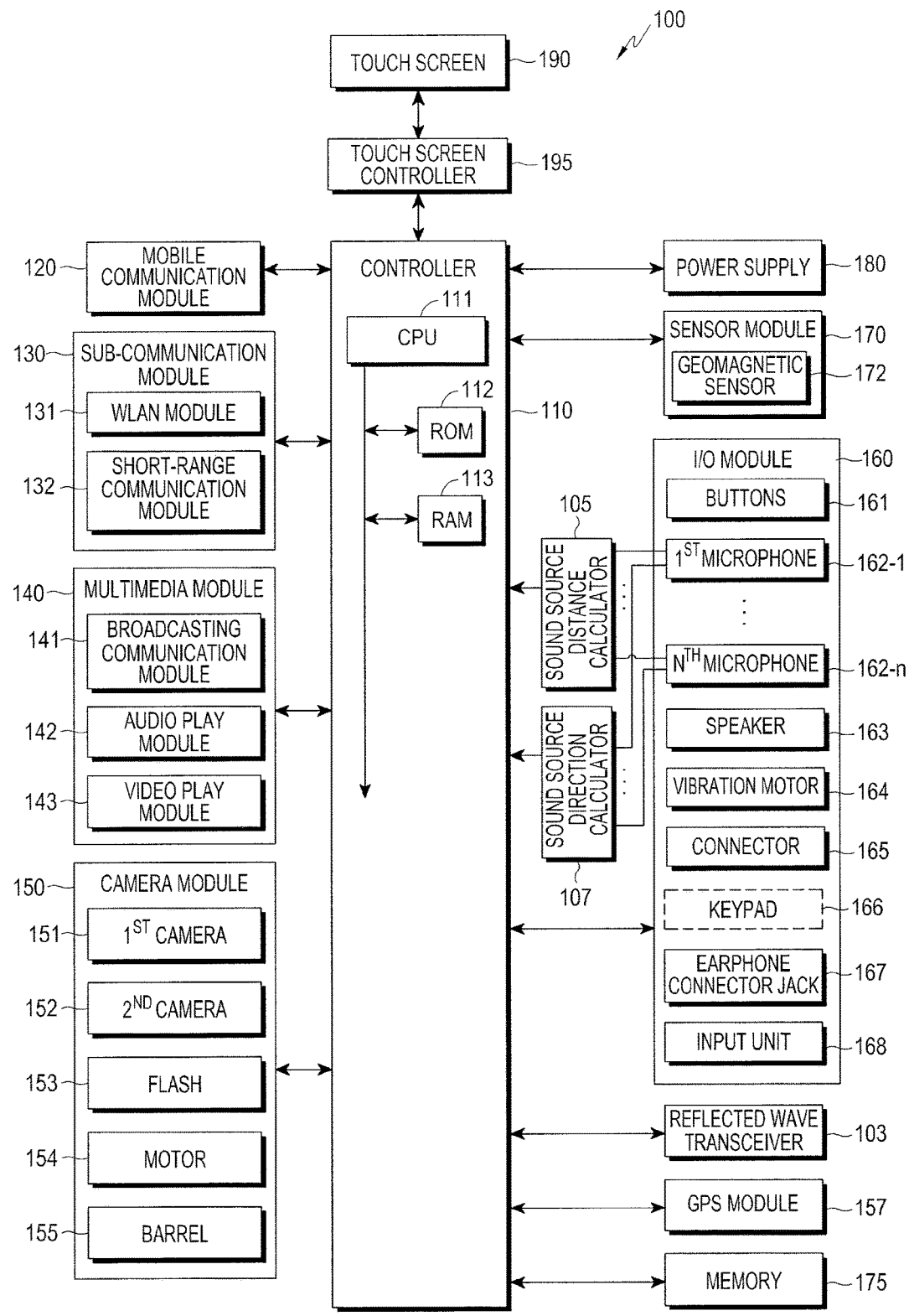
FIG. 2 is a block diagram of a terminal according to an embodiment of the present disclosure.

FIG. 2 is a block diagram of the terminal according to an embodiment of the present disclosure.

Referring to FIG. 2, the terminal 100 may include a reflected-wave transceiver 103, a sound source-distance calculator 105, a sound source-direction calculator 107, and a controller 110. The terminal 100 may further include a mobile communication module 120, a sub-communication module 130, a multimedia module 140, a camera module 150, a Global Positioning Service (GPS) module 157, an Input/Output (I/O) module 160, a sensor module 170, a memory 175, and a power supply 180. Additionally, the terminal 100 may include at least one touch screen 190 and at least one touch screen controller 195.

The controller 110 may include a Central Processing Unit (CPU) 111, a Read Only Memory (ROM) 112 that stores a control program to control the terminal 100, and a Random Access Memory (RAM) 113 that stores an external input signal or data or that is used as a memory space for an operation of the terminal 100. The CPU 111 may include a various number of cores. For example, the CPU 111 may include a single core, dual cores, triple cores, quadruple cores, or the like. The CPU 111, the ROM 112, and the RAM 113 may be connected to one another through an internal bus. The controller 110 may control the reflected-wave transceiver 103, the sound-source distance calculator 105, the sound-source direction calculator 107, the mobile communication module 120, the sub-communication module 130, the multimedia module 140, the camera module 150, the GPS module 157, the I/O module 160, the sensor module 170, the memory 175, the power supply 180, the touch screen 190, and the touch screen controller 195.

The reflected-wave transceiver 103 may transmit an electromagnetic-wave signal in all directions and receive reflected-wave signals resulting from reflecting the electromagnetic-wave signal from objects under the control of the controller 110. The controller 110 may use the reflected-wave signals received from the reflected-wave transceiver 103 in detecting the objects around the terminal 100.

The sound source-distance calculator 105 receives a voice or sound from sound sources through first to nth microphones 162-1 to 162-n, identifies one or more sound sources, and calculates the distance between the terminal 100 and each of the sound sources. Specifically, the sound source-distance calculator 105 generates a plurality of microphone output signals by combining voices or sounds received from sound sources through at least two microphones among the first to nth microphones 162-1 to 162-n and calculates the distance to each sound source based on the sound attenuation rates of the plurality of microphone output signals with respect to distances.

The sound source-direction calculator 107 receives voices or sounds from sound sources through the first to nth microphones 162-1 to 162-n, identifies one or more sound sources, and calculates the direction of each sound source under the control of the controller 110. Specifically, the sound source-direction calculator 107 calculates the direction of each sound source based on a time delay between voices or sounds received from sound sources through at least two microphones among the first to nth microphones 162-1 to 162-n. Information about the direction of each sound source is provided to the controller 110.

The controller 110 may locate at least one object around the terminal 100 (or the user) using the reflected waves received from the reflected-wave transceiver 103.

The controller 110 may identify at least one sound source by receiving voices or sounds from sound sources through the first to nth microphones 162-1 to 162-n. Then the controller 110 analyses the frequency component of the at least one sound source and compares the analyzed frequency component with a predetermined frequency component, thereby determining the type of the at least one sound source. For example, the controller 110 may determine whether a voice or sound from the at least one source sound is a person's voice, a sound coming from an animal, a phone ring, a sound from a vehicle, or the like.

The controller 110 may also calculate the strength of a sound from each sound source, receive information about the distance from the terminal 100 to each sound source from the sound source-distance calculator 105, and receive information about the direction of each sound source from the sound source-direction calculator 107.

According to various embodiments of the present disclosure, the controller 110 may receive from the hearing aid 300 voices or sounds of sound sources received through a plurality of microphones of the hearing aid 300, instead of the first to nth microphones 162-1 to 162-n. Thereafter, the controller 110 may identify at least one sound source, and calculate the sound strength, direction, and distance to the terminal 100 of each sound source. For example, the hearing aid 300 may include at least two microphones and transmit voices or sounds of sound resources received through the at least two microphones to the terminal 100 by communication.

The controller 110 controls display of a terminal image representing the terminal 100 and sound source images representing sound sources on the touch screen 190 based on the positions of the detected objects, the strengths of sounds from the sound sources, the directions of the sound sources, and the distances between the sound sources and the terminal 100. For example, the controller 110 may display the terminal image and the sound source images representing the detected sound sources on a radarscope screen along with at least one of the distance between the terminal 100 and each sound source, the azimuth angle of each sound source, and the strength of a sound from each sound source.

If a sound source is a person's voice, the controller 110 may detect the position of the person, receive information of the person corresponding to the sound source from an external entity like a communication service provider, and display the sound source along with the information of the person corresponding to the sound source. For example, the controller 110 may display the phone number, name, and/or the like of the person corresponding to the sound source.

The distances and directions of sound sources may be displayed with respect to the terminal 100 on the radarscope screen. The sound source images may take the form of figures, characters, or the like. Depending on the sound strengths and distances of sound sources, sound source images representing the sound sources may be different in color or size.

For example, if a sound source emits a loud sound, a sound source image representing the sound source may be displayed larger or in a deeper color than a sound source image representing a sound source that emits a weak sound. If a sound source is near to the terminal 100, a sound source image representing the sound source may be displayed larger or in a deeper color than a sound source image representing a remote sound source. The shape, size, and color of the sound source image of a sound source may be changed selectively according to the sound strength and distance of the sound source.

Alternatively, the controller 110 may control display of the terminal image and the sound source images on a sound source-position indication screen having a predetermined background, instead of the radarscope screen.

As an example, while a terminal image and at least one sound source image are being displayed on the touch screen 190, the controller 110 monitors reception of a user gesture input made by a finger a touch input unit 168 such as an electronic pen. When the user makes a gesture over the touch screen with a finger or the input unit 168, the controller 110 may detect the resulting user gesture input. In an embodiment of the present disclosure, the user gesture input may be at least one of a touch, a touch and hold, a flick, and a hold. Besides, many other user gesture inputs are available.

The controller 110 may select the sound image of a sound source that will output a sound according to a user gesture input from among one or more sound source images and may control output of a sound from the selected sound source through a speaker 163.

Upon selection of at least one of a plurality of predetermined volume levels for a sound source image in response to a user gesture input, the controller 110 may control the speaker 163 to output a sound of a sound source corresponding to the sound source image at the selected volume level.

According to various embodiments of the present disclosure, the controller 110 may select the sound source image of a sound source that will output a sound from among one or more sound source images according to a user gesture input and may control transmission of a sound of the selected sound source to the hearing aid 300 so that the hearing aid 300 may output the sound of the selected sound source.

Upon selection of at least one of a plurality of predetermined volume levels for a sound source image in response to a user gesture input, the controller 110 may control transmission of a sound of the sound source corresponding to the sound source image with a volume controlled based on the selected volume level to the hearing aid 300 so that the hearing aid 300 may output the volume-controlled sound of the selected sound source.

The mobile communication module 120 connects the terminal 100 to an external device through one or more antennas (not shown) by mobile communication under the control of the controller 110. The mobile communication module 120 transmits wireless signals to or receives wireless signals from a portable phone (not shown), a smart phone (not shown), a tablet PC (not shown), or other devices (not shown) that have phone numbers to be input to the terminal 100, for voice call, video call, Short Message Service (SMS), or Multimedia Messaging Service (MMS).

The sub-communication module 130 may include at least one of a Wireless Local Area Network (WLAN) module 131 and a short-range communication module 132. For example, the sub-communication module 130 may include the WLAN module 131, or the short-range communication module 132, individually or in combination.

The WLAN module 131 may be connected to the Internet under the control of the controller 110 in a place at which a wireless Access Point (AP) (not shown) is installed. The WLAN module 131 supports the WLAN standard, the Institute of Electrical and Electronics Engineers (IEEE) 802.11x. The short-range communication module 132 may conduct short-range wireless communication between the terminal 100 and an image forming device (not shown) under the control of the controller 110. The short-range communication may conform to Bluetooth, Infrared Data Association (IrDA), Wireless Fidelity (Wi-Fi) Direct, Near Field Communication (NFC), and the like.

The terminal 100 may communicate with the hearing aid 300 through at least one of the mobile communication module 120 and the sub-communication module 130. In addition, the terminal 100 may transmit a sound of a sound source to the hearing aid 300 through at least one of the mobile communication module 120 and the sub-communication module 130. For example, the terminal 100 may transmit a sound of a user-selected sound source to the hearing aid 300 through at least one of the mobile communication module 120 and the sub-communication module 130. The terminal 100 may also transmit a sound of a sound source with a volume controlled based on a user-selected volume level to the hearing aid 300 through at least one of the mobile communication module 120 and the sub-communication module 130.

The terminal 100 may include at least one of the mobile communication module 120, the WLAN module 131, and the short-range communication module 132 according to the capabilities of the terminal 100. For example, the terminal 100 may include a combination of the mobile communication module 120, the WLAN module 131, and the short-range communication module 132 according to the capabilities of the terminal 100. In the present disclosure, one or more of the mobile communication module 120, the WLAN module 131, and the short-range communication module 132 are collectively referred to as a transceiver, which should not be construed as limiting the scope of the present disclosure.

The multimedia module 140 may include a broadcasting communication module 141, an audio play module 142, or a video play module 143. The broadcasting communication module 141 may receive a broadcast signal (e.g., a TV broadcast signal, a radio broadcast signal, a data broadcast signal, or the like) and additional broadcasting information (e.g., an Electronic Program Guide (EPG), Electronic Service Guide (ESG), or the like) from a broadcasting station through a broadcasting communication antenna (not shown) under the control of the controller 110. The audio play module 142 may open a stored or received digital audio file (e.g., a file having such an extension as mp3, wma, ogg, way, or the like) under the control of the controller 110. The video play module 143 may open a stored or received digital video file (e.g., a file having such an extension as mpeg, mpg, mp4, avi, mov, mkv, or the like) under the control of the controller 110. The video play module 143 may also open a digital audio file.

According to various embodiments of the present disclosure, the multimedia module 140 may include any combination of the broadcasting communication module 141, the audio play module 142, and the video play module 143. For example, the multimedia module 140 may include the audio play module 142 and the video play module 143 except the broadcasting communication module 141.

According to various embodiments of the present disclosure, the audio play module 142 or the video play module 143 of the multimedia module 140 may be incorporated into the controller 110.

The camera module 150 may include at least one of a first camera 151 and a second camera 152, to capture a still image or a video under the control of the controller 110. Further, the first camera 151 or the second camera 152 may include at least one of a barrel 155 to zoom in or zoom out relative to an object when the object is captured, a motor 154 to control movement of the barrel 155, and a flash 153 to provide an auxiliary light source for capturing an image. The first camera 151 may be disposed on the front surface of the terminal 100, and the second camera 152 may be disposed on the rear surface of the terminal 100. Alternatively, the first camera 151 and the second camera 152 may be arranged near to each other (e.g., the distance between the first camera 151 and the second camera 152 may be between 1 cm and 8 cm) in order to capture a three-dimensional still image or video. The camera module 150 transmits a captured picture or image to the controller 110.

Each of the first and second cameras 151 and 152 may include a lens system and an image sensor. Each of the first and second cameras 151 and 152 may convert an optical signal received (or captured) at the lens system to an electrical image signal and output the electrical image signal to the controller 110. Therefore, the user may capture a video or a still image using the first and second cameras 151 and 152.

The GPS module 157 may receive signal waves from a plurality of GPS satellites (not shown) in Earth orbit and calculate the position of the terminal 100 based on the Time of Arrivals (ToAs) of satellite signals from the GPS satellites to the terminal 100.

The I/O module 160 may include at least one of a plurality of buttons 161, the first to nth microphones 162-1 to 162-n, the speaker 163, a vibration motor 164, a connector 165, a keypad 166, an earphone connector jack 167, an input unit 168, and the like. However, the I/O module 160 is not limited to these components and may provide cursor control to communicate with the controller 110 and to control cursor movement on the touch screen 190 through a mouse, a track ball, a joy stick, cursor directional keys, or the like.

The buttons 161 may be formed on the front surface, a side surface, or the rear surface of a housing of the terminal 100, and may include at least one of a power/lock button (not shown), a volume button (not shown), a menu button, a home button, a back button, a search button (not shown), and the like.

The first to nth microphones 162-1 to 162-n receive voices or sounds from sound sources and convert the received voices or sounds to electrical signals under the control of the controller 110. For example, the first to nth microphones 162-1 to 162-n may receive voices or sounds from sound sources around the terminal 100, such as music played by a player, speech from a person, a phone ringing sound, a speech from a speaker, and the like.

The speaker 163 may output sounds corresponding to various signals (e.g., a wireless signal, a broadcast signal, a digital audio file, a digital video file, a photo shot, and the like) received from the mobile communication module 120, the sub-communication module 130, the multimedia module 140, and the camera module 150 to the outside of the terminal 100. According to various embodiments of the present disclosure, the speaker 163 may amplify a sound of a sound source selected from among sound sources around the terminal 100 by the user and output the amplified sound to the outside under the control of the controller 110. The volume of a sound of a sound source may be controlled according to a user gesture input. One or more speakers 163 may be disposed at an appropriate position or positions of the housing of the terminal 100.

The vibration motor 164 may convert an electrical signal to a mechanical vibration under the control of the controller 110. For example, when the terminal 100 receives an incoming voice call from another device (not shown) in vibration mode, the vibration motor 164 operates. One or more vibration motors 164 may be mounted inside the housing of the terminal 100. The vibration motor 164 may operate in response to a user's touch on the touch screen 190 and a continuous movement of the touch on the touch screen 190.

The connector 165 may be used as an interface to connect the terminal 100 to an external device (not shown) or a power source (not shown). The terminal 100 may transmit data stored in the memory 175 to the external device via a cable connected to the connector 165 or may receive data from the external device via the cable, under the control of the controller 110. The terminal 100 may receive power or charge a battery (not shown) from the power source via the cable connected to the connector 165.

The keypad 166 may receive a key input from the user to control the terminal 100. The keypad 166 includes a physical keypad (not shown) formed in the terminal 100 or a virtual keypad (not shown) displayed on the touch screen 190. According to various embodiments of the present disclosure, the physical keypad may not be provided according to the capabilities or configuration of the terminal 100.

An earphone (not shown) may be inserted into the earphone connector jack 167 and thus connected to the terminal 100.

The input unit 168 may be inserted into the terminal 100. When the input unit 168 is used, the input unit 168 may be extended or detached from the terminal 100. An insertion and removal detecting switch (not shown) is provided at an area of the terminal 100 in which the input unit 168 is inserted, in order to operate according to insertion and removal of the input unit 168 and provide a signal indicating insertion or removal of the input unit 168 to the controller 110. The insertion and removal switch is configured to directly or indirectly contact the input unit 168 in the insertion area of the input unit 168, when the input unit 168 is inserted. Thus, the insertion and removal switch generates a signal indicating insertion or removal of the input unit 168 and provides the generated signal to the controller 110.

The sensor module 170 includes at least one sensor to detect a state of the terminal 100. For example, the sensor module 170 may include a proximity sensor to detect whether the user is close to the terminal 100, an illuminance sensor (not shown) to detect the amount of ambient light around the terminal 100, a motion sensor (not shown) to detect a motion of the terminal 100 (for example, rotation, acceleration, or vibration of the terminal 100), a geomagnetic sensor 172 to detect a point of the compass using the earth's magnetic field, a gravity sensor (not shown) to detect the direction of gravity, and an altimeter (not shown) to detect an altitude by measuring the air pressure. At least one sensor may detect a state of the terminal 100, generate a signal corresponding to the detected state, and transmit the generated signal to the controller 110. A sensor may be added to or removed from the sensor module 170 according to the capabilities of the terminal 100.

The memory 175 may store input/output signals or data in accordance with operations of the mobile communication module 120, the sub-communication module 130, the multimedia module 140, the camera module 150, the GPS module 157, the I/O module 160, the sensor module 170, and the touch screen 190 under the control of the controller 110. The memory 175 may store a plurality of programs to control the terminal 100 or the controller 110, and a plurality of applications.

The term "memory" covers the memory 175, the ROM 112 and the RAM 113 within the controller 110, or a memory card (not shown) (e.g., a Secure Digital (SD) card, a memory stick, and the like) mounted to the terminal 100. The memory may include a non-volatile memory, a volatile memory, a Hard Disk Drive (HDD), or a Solid State Drive (SSD).

The memory 175 may store applications having various functions such as navigation, video call, game, and time-based alarm applications, images used to provide GUIs related to the applications, user information, text, databases or data related to a method of processing a touch input, background images (e.g., a menu screen, a waiting screen, a radarscope screen, a sound source-position indication screen, and the like) or operation programs required to operate the terminal 100, and still images and pictures captured by the camera module 150. The memory 175 is a non-transitory machine-readable medium (e.g. a non-transitory computer-readable medium). A non-transitory machine-readable medium may be defined as a medium that provides data to a machine so that the machine may perform a specific function. The non-transitory machine-readable medium may be a storage medium. The memory 175 may include a volatile medium and a non-volatile medium. The media should be a type of media that transfers commands detectable by a physical device that reads the commands to the machine.

According to various embodiments of the present disclosure, non-transitory machine-readable media include at least one of a floppy disk, a flexible disk, a hard disk, a magnetic tape, a Compact Disk Read Only Memory (CD-ROM), an optical disk, a punch card, a paper tape, a RAM, a Programmable ROM (PROM), an Erasable PROM (EPROM), a Flash-EPRIM, and the like.

The power supply 180 may supply power to one or more batteries (not shown) mounted in the housing of the terminal 100 under the control of the controller 110. The one or more batteries supply power to the terminal 100. Further, the power supply 180 may supply power received from an external power source (not shown) via the cable connected to the connector 165 to the terminal 100. The power supply 180 may also supply power received wirelessly from the external power source to the terminal 100 by a wireless charging technology.

According to various embodiments of the present disclosure, the terminal 100 may include at least one touch screen to provide User Interfaces (UIs) corresponding to various services (e.g., call, data transmission, broadcasting, photo shot, and sound source-position indication). Each touch screen may transmit an analog signal corresponding to at least one touch on a UI to a touch screen controller corresponding to the touch screen. As many touch screen controllers as touch screens may be provided to receive analog signals from the touch screens. According to various embodiments of the present disclosure, the terminal 100 may include at least one touch screen. For the convenience of description, a case of using a single touch screen will be described.

The touch screen 190 may receive at least one user gesture input through a user's body (e.g., fingers including an index finger) or the touch input unit 168 (e.g., a stylus pen, an electronic pen, or the like). The touch screen 190 includes a pen recognition panel (not shown) to recognize a user gesture input from the stylus pen or the electronic pen. The pen recognition panel may recognize the distance between the pen and the touch screen 190 by a magnetic field. In addition, the touch screen 190 may receive a continuous movement of at least one successive touch as a user gesture input. According to various embodiments of the present disclosure, the touch screen 190 may provide an analog signal corresponding to a user gesture input to the touch screen controller 195.

The touch screen 190 may be configured as, for example, a resistive type, a capacitive type, an infrared type, an acoustic wave type, and/or the like.

To sequentially or simultaneously receive gesture inputs from the user's body or the touch input unit 168, the touch screen 190 may include at least two touch screen panels (not shown) to respectively detect touches or proximity of the user's body and the touch input unit 168. The at least two touch screen panels provide different output values to the touch screen controller 195. The touch screen controller 195 distinguishes the values received from the at least two touch screen panels from each other, and determines whether an input value from the touch screen 190 has been generated from a gesture input of the user's body or from the touch input unit 168.

More specifically, the touch screen 190 may include a stack of a panel to detect an input from a finger or the input unit 168 by a variation in induced electrical power, and a panel to detect a touch from the finger or the input unit 168. The two panels are spaced partially from each other or brought into contact. The touch screen 190 includes a large number of pixels and displays an image at the pixels. According to various embodiments of the present disclosure, the touch screen 190 may be configured as a Liquid Crystal Display (LCD), an Organic Light Emitting Diode (OLED) display, an LED display, or the like.

Figure 3:
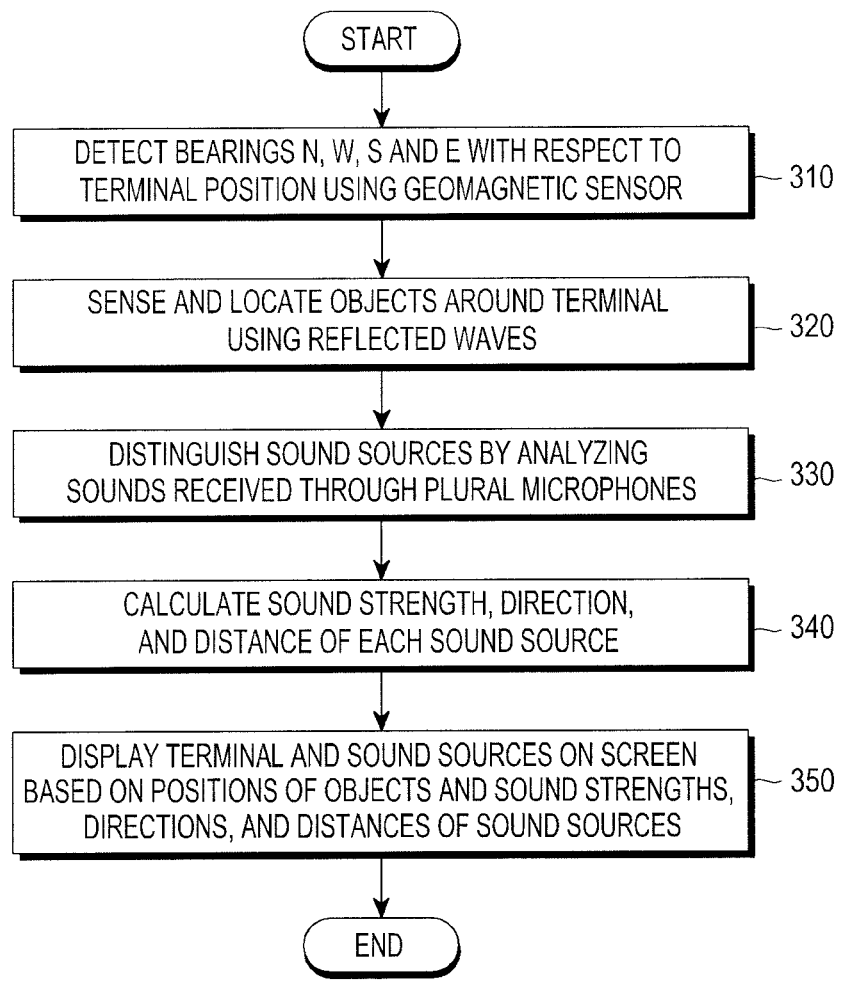
FIG. 3 is a flowchart illustrating an operation of displaying at least one adjacent sound source in a terminal according to an embodiment of the present disclosure.

FIG. 3 is a flowchart illustrating an operation of displaying at least one sound source around the terminal 100 according to an embodiment of the present disclosure.

Referring to FIG. 3, at operation 310, the terminal 100 may determine the bearings of East, West, South, and North with respect to the position of the terminal 100 by means of the geomagnetic sensor 172. Specifically, the terminal 100 may detect the position of the terminal 100 by means of the GPS module 157 and may determine the bearings of East, West, South, and North with respect to the position of the terminal 100 by means of the geomagnetic sensor 172.

At operation 320, the terminal 100 may detect objects around the terminal 100 using reflected waves and locate the detected objects. For example, the terminal 100 may transmit an electromagnetic-wave signal in all directions through the reflected-wave transceiver 113 and receive reflected-wave signals corresponding to the transmitted electromagnetic-wave signals being reflected from objects. The terminal 100 may detect one or more objects around the position of the terminal 100 and may locate the one or more objects using the received reflected-wave signals.

At operation 330, the terminal 100 may distinguish one or more sound sources from one another by analyzing sounds received through a plurality of microphones. For example, the terminal 100 may distinguish one or more sound sources by analyzing voices or sounds received from the sound sources through the first to nth microphones 162-1 to 162-n. According to various embodiments of the present disclosure, the terminal 100 may receive from the hearing aid 300 voices or sounds that the hearing aid 300 has received from sound sources through a plurality of microphones and may distinguish one or more sound sources from one another. For example, rather than receiving the voices or sounds through the first to nth microphones 162-1 to 162-n, the terminal 100 may receive voices or sounds that the hearing aid 300 has received from sound sources through a plurality of microphones included in the hearing aid 300. Thereafter, the terminal 100 may distinguish among the one or more sound sources from which the voices or sounds originate (or are emitted).

At operation 340, the terminal 100 calculates the sound strength, direction, and distance of each of the distinguished sound sources. For example, the terminal 100 may calculate the sound strength of each sound source by analyzing voices or sounds of the sound sources through the first to nth microphones 162-1 to 162-n. In addition, the controller 110 may calculate the distance between the terminal 100 and each sound source through the sound source-distance calculator 103 and may calculate the direction of each sound source through the sound source-direction calculator 105.

At operation 350, the terminal 100 displays the terminal 100 and one or more sound sources around the terminal 100 based on the positions of the detected objects, the calculated sound strengths, directions, and distances of the sound sources. For example, the terminal 100 may display the relative positions of the one or more sound sources around the terminal 100.

For example, the terminal 100 selects at least one sound source to be displayed on the touch screen 190 from among one or more sound sources around the terminal 100 and determines a position at which the selected sound source is to be displayed on the touch screen 190. Thereafter, the terminal 100 displays the at least one sound source at the determined position of the touch screen 190.

Specifically, the terminal 100 may select at least one sound source within a predetermined distance from the terminal 100 or at least one sound source having a sound strength equal to or larger than a predetermined (or selected) level from among one or more sound sources around the terminal 100, so that the selected at least one sound source may be displayed on the touch screen 190.

The display position of the selected at least one sound source may be determined, taking into account the size of the touch screen 190 and the distance between the terminal 100 and the at least one sound source.

For example, the center point of the touch screen 190 may be set as the position of the terminal 100 and the display position of the at least one sound source may be determined with respect to the center point of the touch screen 190 based on the distance between the terminal 100 and the at least one sound source, taking into account the size of the touch screen 190. For example, the terminal 100 may display the position of the terminal and the relative positions of the at least one sound source based on a scaling according to the size of the touch screen 190.

The terminal 100 may display a terminal image representing the terminal 100 at the position of the terminal 100 on the touch screen 190 and at least one sound source image representing the at least one sound source at the determined position of the at least one sound source on the touch screen 190.

The terminal 100 may display the terminal image and the at least one sound source image on a predetermined type of screen and may additionally display at least one of the distance, an azimuth angle, and a type of the at least one sound source on the screen.

A sound source image may take the form of a figure, a character, or the like to represent a sound source. The sound source image may be displayed in a different color or size according to the sound strength and distance of the sound source. For example, if a sound source emits a loud sound, a sound source image representing the sound source may be displayed larger or in a deeper color than a sound source image representing a sound source that emits a weak sound. As another example, if a sound source is near to the terminal 100, a sound source image representing the sound source may be displayed larger or in a deeper color than a sound source image representing a remote sound source. The shape, size, and color of a sound source image corresponding to a sound source may be changed selectively according to the sound strength and distance of the sound source. A sound source image may be formed into a shape matching the type of a sound source. For example, the sound source image may be formed into a shape representing that the type of the sound source corresponds to a person, a phone, or an instrument, and the like.

If the type of a sound source is a person's voice, the terminal 100 may detect the position of the person, receive information (e.g., the phone number and name) of the person corresponding to the sound source from an external entity like a communication service provider, and display the sound source along with information of the corresponding to the sound source. According to various embodiments of the present disclosure, the terminal 100 may determine that the person from whom the sound is received corresponds to a contact stored in the terminal 100. As a result, the terminal 100 may retrieve and display contact information (e.g., phone number, name, and/or the like) associated with the person.

The terminal 100 and sound sources around the terminal 100 may be displayed in a predetermined indication scheme such as a radarscope display scheme, a sound source-position indication scheme other than the radarscope display scheme, or other unmentioned schemes.

An embodiment of the present disclosure in which the terminal 100 and sound sources around the terminal 100 are displayed in the radarscope display scheme will first be described.

Figure 4:
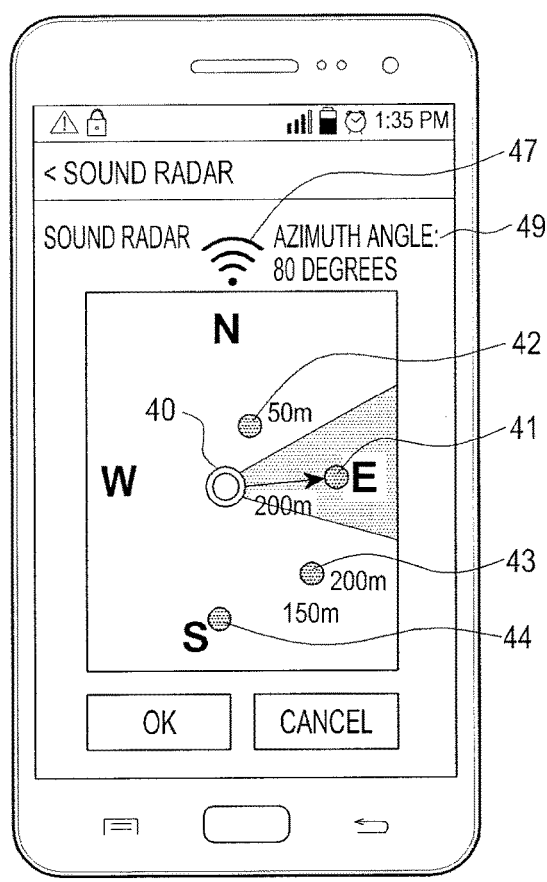
FIG. 4 illustrates a radarscope screen that displays sound sources around a terminal according to an embodiment of the present disclosure.

FIG. 4 illustrates a radarscope screen that displays sound sources around a terminal according to an embodiment of the present disclosure.

Referring to FIG. 4, the distances and directions of sound sources may be displayed with respect to the terminal 100 on a radarscope screen. The bearings of North, West, South, and East are marked with N, W, S and E on the radarscope screen. A terminal image 40 representing the terminal 100 and one or more sound source images 41 to 44 respectively representing sound sources may be displayed on the radarscope screen. The radarscope screen may further display the distance between the terminal 100 and each sound source, and the sound strength 47 and azimuth angle 49 of the sound source. For example, if a source image of source images 41 to 44 is selected, the terminal 100 may display detailed information about the sound source and/or the corresponding sound. For example, the terminal 100 may display the distance between the terminal and the selected sound source, the sound strength of the sound from the selected sound source, contact information or other information relating to characteristics of the selected sound source, and the like.

Figure 5:
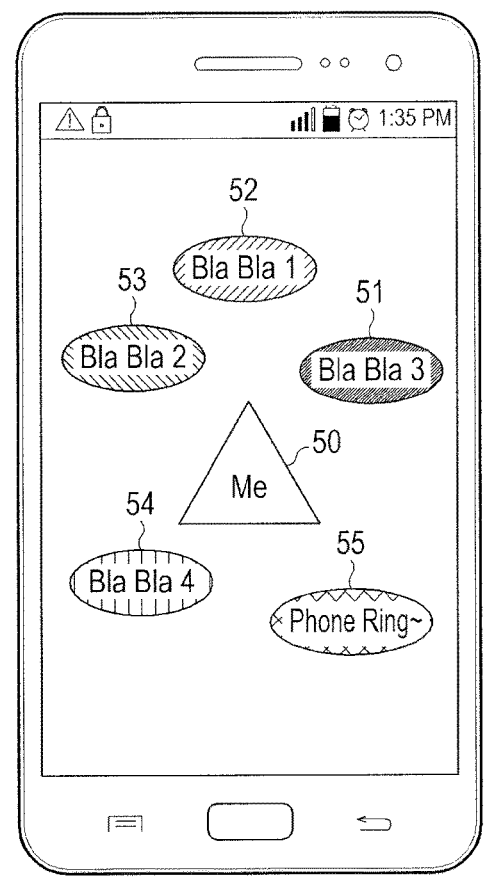
FIG. 5 illustrates a sound source-position indication screen that displays sound sources around a terminal according to an embodiment of the present disclosure.

FIG. 5 illustrates a screen that displays the positions of sound sources around a terminal according to an embodiment of the present disclosure.

Referring to FIG. 5, a sound source-position indication screen may display a terminal image 50 representing the terminal 100 and one or more sound source images 51 to 55 representing sound sources. If a sound source outputs a loud sound, the sound source image of the sound source may be displayed in a deeper color than the sound source image of a sound source that outputs a weak sound. The sound source image of a sound source may indicate whether the type of the sound source is a person's voice (Bla Bla) or a phone ring. According to various embodiments of the present disclosure, the sound source image of the sound source may indicate other types (e.g., common types) of sound sources.

With sound sources around the terminal 100 displayed on a screen in the above manner, the terminal 100 may select a sound source according to a user gesture input, output a sound of the selected sound source, and control the volume of the output sound.

Figure 6:
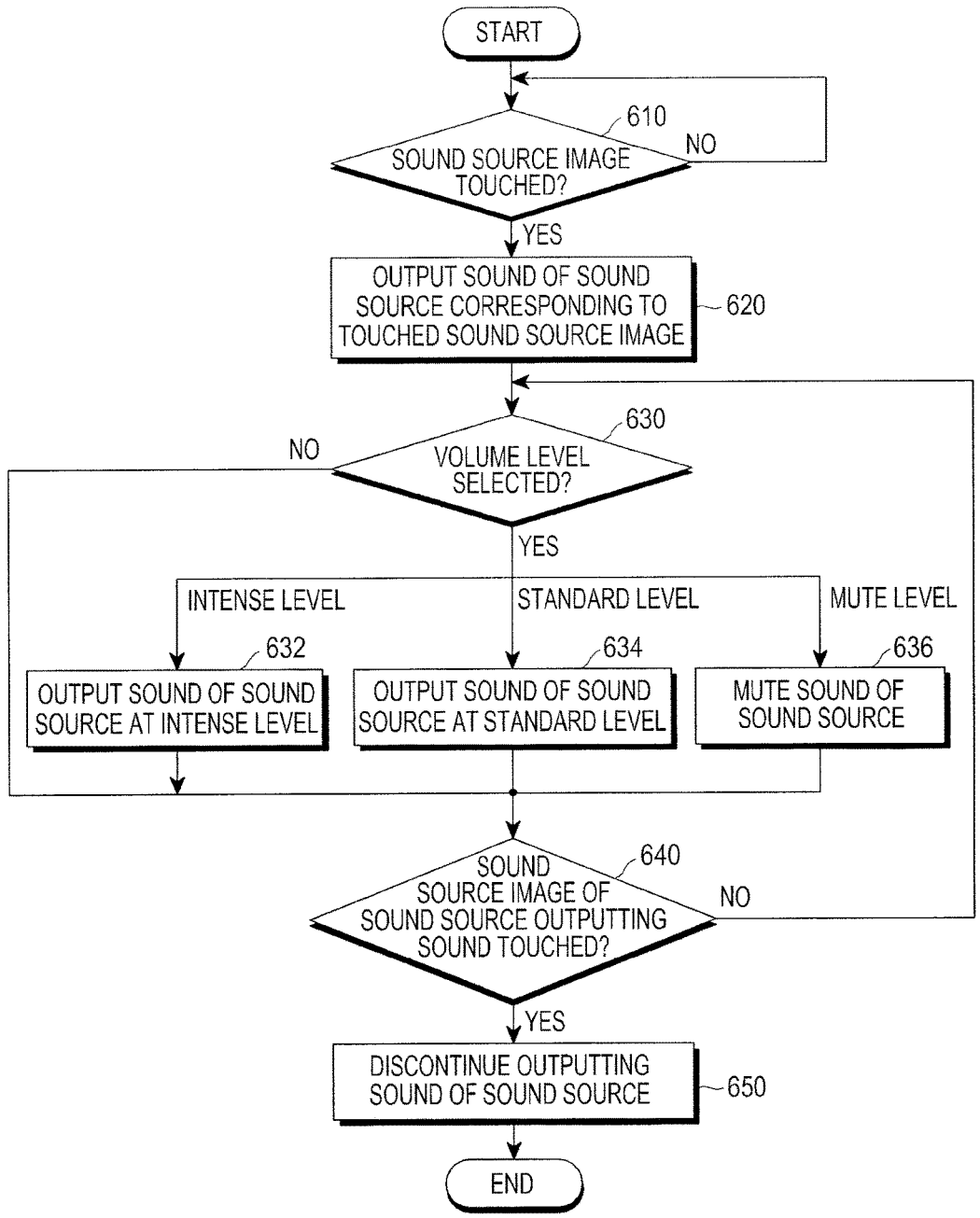
FIG. 6 is a flowchart illustrating an operation of outputting sounds of sound sources in a terminal according to an embodiment of the present disclosure.
Figures 7A, 7B:
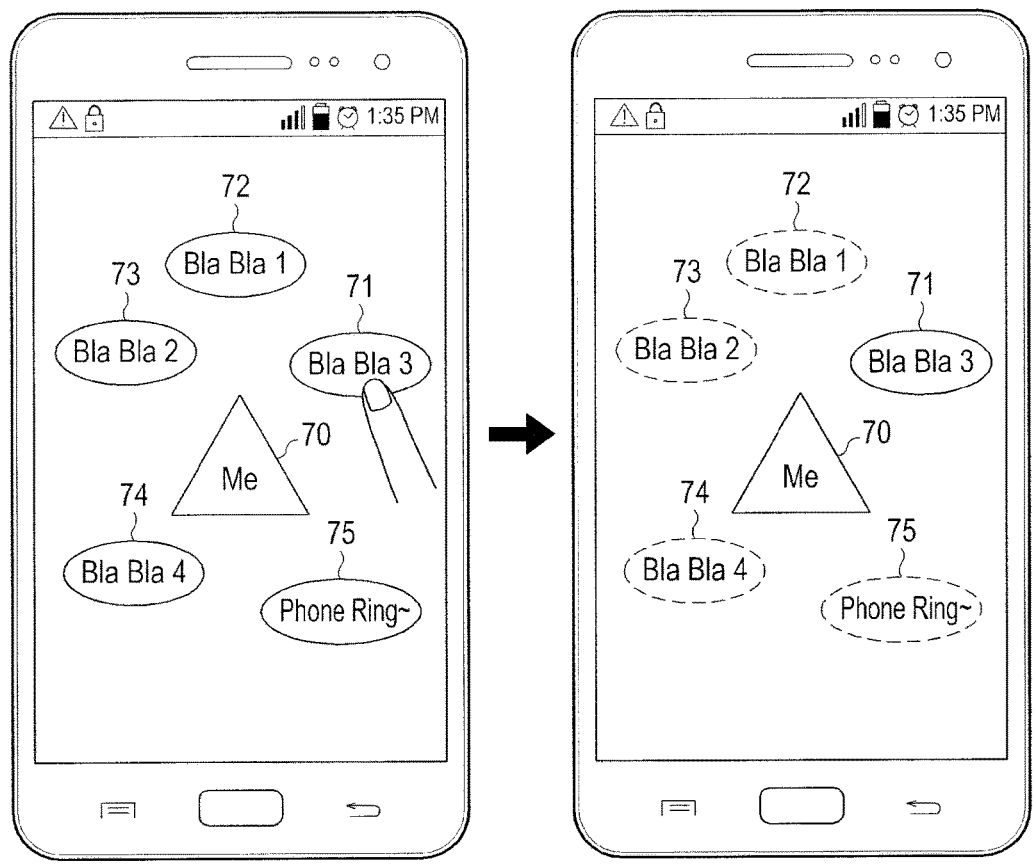
FIGS. 7A and 7B illustrate screens of a terminal that display sound sources around the terminal according to an embodiment of the present disclosure.

FIG. 6 is a flowchart illustrating an operation of outputting sounds of sound sources in a terminal according to an embodiment of the present disclosure. FIGS. 7A and 7B illustrate screens of a terminal that display sound sources around the terminal according to an embodiment of the present disclosure.

Referring to FIGS. 6, 7A and 7B, at operation 610, the terminal 100 may determine whether a user has touched a sound source image on a screen that displays a terminal image 70 and sound source images 71 to 75 representing sound sources around the terminal 100. The user may touch a sound source image on the screen with a finger or the input unit 168 such as a touch pen or a stylus pen.

If the terminal 100 determines that the user has not touched a sound source image on the screen at operation 610, then the terminal 100 may continue to poll for a user touch on a sound source image (e.g., until the terminal 100 is interrupted to perform another corresponding function based on user input or other operations).

In contrast, if the terminal 100 determines that the user has touched a sound source image on the screen at operation 610, then upon detecting of a touch on a sound source image, the terminal proceeds to operation 620 at which the terminal 100 may output a sound of a sound source corresponding to the touched sound source image. For example, when the sound source image 71 corresponding Bla Bla 3 is touched as illustrated in FIG. 7A, the terminal 100 may output a sound of a sound source corresponding to the touched sound source image 71.

According to various embodiments of the present disclosure, the terminal 100 may transmit a sound of the sound source corresponding to the touched sound source image to the hearing aid 300. For example, the terminal 100 may transmit the sound of the sound source corresponding to the touched (e.g., selected) sound source image to the hearing aid 300 so that the hearing aid 300 may output the sound of the sound source.

When the sound source image 71 corresponding Bla Bla 3 is touched as illustrated in FIG. 7A, the touched sound source image 71 may be displayed in a different manner from the other sound source images 72 to 75 to indicate the touched sound source image 71 as illustrated in FIG. 7B. For example, the touched sound source image 71 may be displayed so as to have a solid outline, and the other sound source images 72 to 75 may be displayed so as to have a dotted outline. According to various embodiments of the present disclosure, other indicia may be used to identify the touched sound source image (e.g., shading, bolding, and the like).

According to various embodiments of the present disclosure, if a plurality of sound source images are touched, sounds of sound sources corresponding to touched (e.g., selected) the plurality of sound source images may be output and the touched sound source images may be displayed differently from the other sound source images so that the touched sound source images may be identified.

At operation 630, the terminal 100 determines whether the user has selected a volume level. For example, one of an intense level, a standard level, and a mute level may be selected according to a user gesture input. The intense level may be a highest volume level, the standard level may be a medium volume level, and the mute level may be a mute sound. The volume levels may further include a level that increases the volume of a selected sound source above those of the other sound sources or a level that decreases the volume of a selected sound source below those of the other sound sources.

According to various embodiments of the present disclosure, a various number of volume levels may be defined (e.g., besides the three volume levels). According to various embodiments of the present disclosure, the volume level may be set by setting a volume bar between a muted position and a position corresponding to a maximum volume. The volumes of the intense level, the standard level, and the mute level may be set by a user or a developer.

If the terminal 100 determines that the user has selected the intense level, then the terminal 100 may proceed to operation 632 at which the terminal 100 may output the sound of the sound source with a volume corresponding to the intense level.

If the terminal 100 determines that the user has selected the standard level, then the terminal 100 may proceed to operation 634 at which the terminal 100 may output the sound of the sound source with a volume corresponding to the standard level.

If the terminal 100 determines that the user has selected the mute level, then the terminal 100 may proceed to operation 636 at which the terminal 100 may mute the sound of the sound source.

According to various embodiments of the present disclosure, the terminal 100 may transmit the sound of the sound source with a volume controlled to a selected volume level to the hearing aid 300 so that the hearing aid 300 may output the volume-controlled sound.

In contrast, if the terminal 100 determines that no volume level has been selected during outputting the sound of the sound source at operation 630, then the terminal 100 proceeds to operation 640 at which the terminal 100 monitors a touch on the sound source image corresponding to the sound source that is outputting sound. For example, at operation 640, the terminal 100 determines whether the user touches the sound source image corresponding to the sound source outputting sound.

If the terminal 100 determines that the sound source image corresponding to the sound source outputting sound is touched, then the terminal 100 proceeds to operation 650 at which the terminal 100 discontinues outputting the sound of the sound source.

If the terminal 100 determines that the sound source image corresponding to the sound source outputting sound is not touched, then the terminal 100 may proceed to operation 630.

According to various embodiments of the present disclosure, if the terminal 100 is outputting the sound of the sound source to the hearing aid 300, the terminal 100 may discontinue outputting the sound of the sound source to the hearing aid 300.

As described above, with sound sources around the terminal 100 displayed on a screen, a user may select a sound source on the screen and the terminal 100 or the hearing aid 300 may output a sound of the selected sound source. In addition, the user may adjust the volume of the sound of the sound source. Therefore, a hearing-impaired person may hear an intended sound source.

While it has been described in the above embodiment of the present disclosure that the terminal 100 selects a sound source from which sound is to be output if a user gesture input is a touch, the terminal 100 may select a user-intended sound source by recognizing many user gesture inputs other than a touch.

Figure 8:
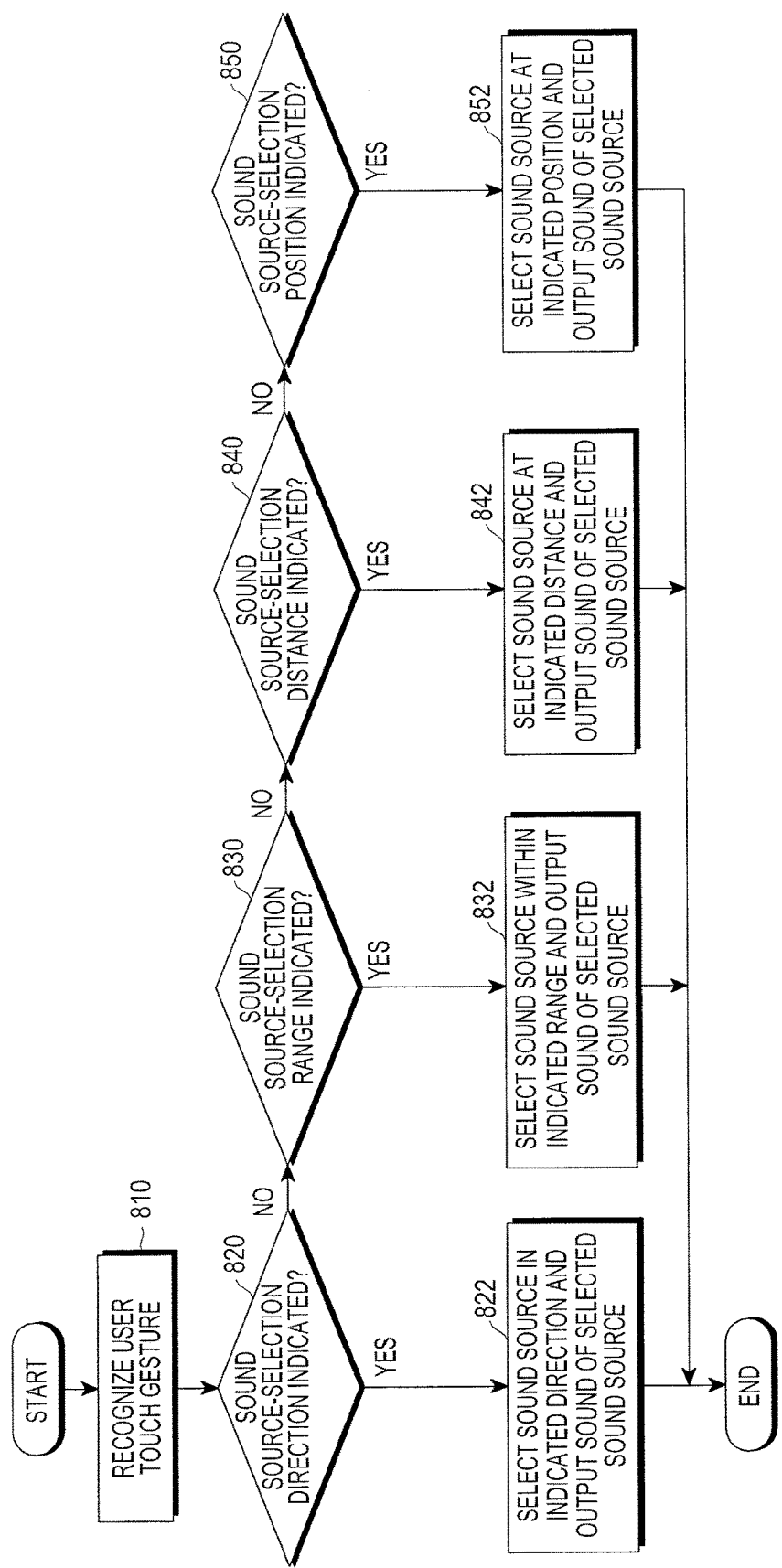
FIG. 8 is a flowchart illustrating an operation of selecting a sound source according to a recognized user gesture in a terminal according to an embodiment of the present disclosure.

FIG. 8 is a flowchart illustrating an operation of selecting a sound source according to a recognized user gesture in a terminal according to an embodiment of the present disclosure.

Referring to FIG. 8, at operation 810, the terminal 100 recognizes (e.g., detects) a user gesture. The user gesture input may be a single gesture input or successive inputs of a plurality of user gestures.

For example, the user gesture input may be a drag input. The user gesture input may be a flick input following a touch and hold input. The user gesture input may be a flick and then hold input after a touch and hold input. The user gesture input may be a hold input at a specific point of the circumference of a circle having a radius defined by a flick input following a touch and hold input. According to various embodiments of the present disclosure, the user gesture may be a voice input.

At operation 820, the terminal 100 determines whether the user gesture input indicates a sound source-selection direction. For example, a user gesture input indicating a sound source-selection direction may be a drag input in an intended sound-output direction after a terminal image is selected.

Figure 9:
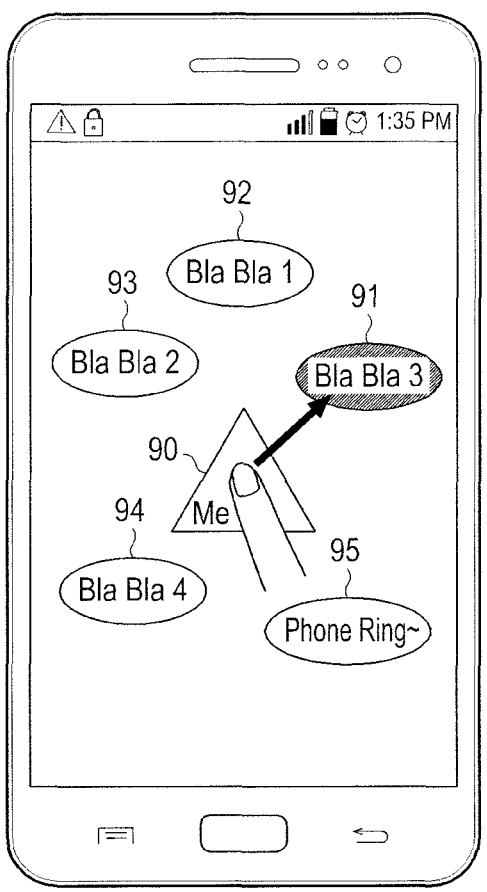
FIG. 9 illustrates a user gesture input indicating a sound source-selection direction according to an embodiment of the present disclosure.

FIG. 9 illustrates a user gesture input indicating a sound source-selection direction according to an embodiment of the present disclosure.

Referring to FIG. 9, while sound source images 91 to 95 representing one or more sound sources around the terminal 100 are being displayed on a screen, upon receipt of a drag input from a terminal image 90 toward the sound source image 92 corresponding to Bla Bla 3, the terminal 100 determines a sound source-selection direction based on the drag input.

If the terminal 100 determines that the user gesture input indicates a sound source-selection direction at operation 820, then upon the sound source-selection direction being determined, the terminal 100 proceeds to operation 822 at which the terminal 100 selects a sound source in the sound source-selection direction and outputs a sound of the selected sound source.

In contrast, if the terminal 100 determines that the user gesture input does not indicate a sound source-selection direction at operation 820, then the terminal 100 proceeds to operation 830 at which the terminal 100 determines whether the user gesture input indicates a sound source-selection range. For example, a user gesture input indicating a sound source-selection range may be a flick input to a specific range after a touch and hold input to a terminal image.

Figure 10A:
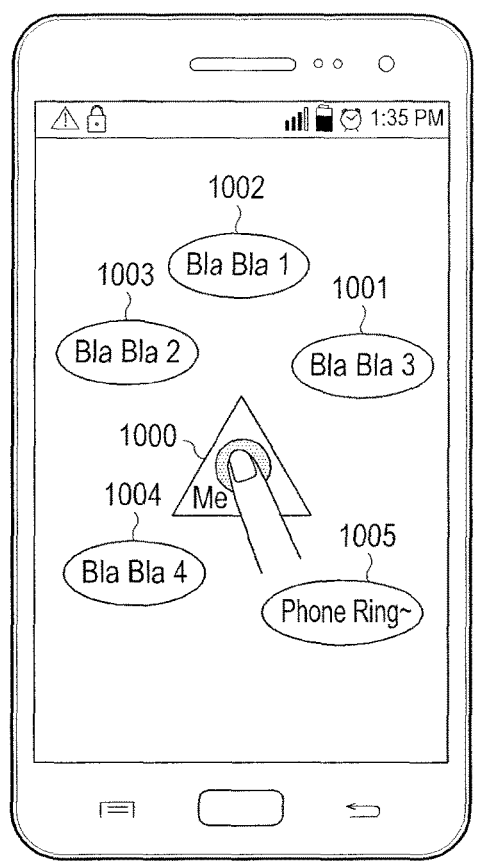
FIGS. 10A and 10B illustrate a user gesture input indicating a sound source-selection range according to an embodiment of the present disclosure.
Figure 10B:
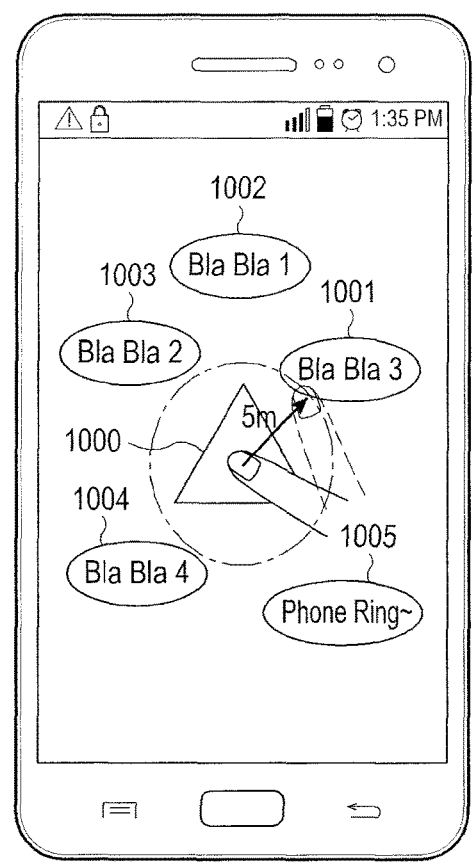

FIGS. 10A and 10B illustrate a user gesture input indicating a sound source-selection range according to an embodiment of the present disclosure.

Referring to FIGS. 10A and 10B, while a terminal image 1000 and sound source images 1001 to 1005 representing one or more sound sources around the terminal 100 are being displayed on a screen, upon receipt of a touch and hold input to the terminal image 1000 as illustrated in FIG. 10A, and then a flick input corresponding to a specific range (e.g., a 5-m range) as illustrated in FIG. 10B, the terminal 100 determines a sound source-selection range according to the received inputs. The terminal 100 may display a touched and held point according to the touch and hold input and then determine a specific range according to the length of the flick input. According to various embodiments of the present disclosure, the source-selection range may be configured using another input or through a menu selection.

If the terminal 100 determines that the user gesture input indicates a sound-source selection range at operation 830, then the terminal 100 proceeds to operation 832 at which the terminal 100 selects at least one sound source within the indicated range and outputs the sound of the selected at least one sound source.

In contrast, if the terminal 100 determines that the user gesture input does not indicate a sound-source selection range at operation 830, then the terminal 100 proceeds to operation 840 at which the terminal 100 determines whether the user gesture input indicates a sound source-selection distance. For example, a user gesture input indicating a sound source-selection distance may be a flick input and then a hold input after a touch and hold input.

FIGS. 11A to 11C illustrate a user gesture input indicating a sound source-selection distance according to an embodiment of the present disclosure.

Referring to FIGS. 11A to 11C, while a terminal image 1110 representing the terminal 100 and sound source images 1111 to 1115 representing one or more sound sources around the terminal 100 are being displayed on a screen, upon receipt of a touch and hold input to the terminal image 1110 as illustrated in FIG. 11A and then a flick input corresponding to a specific distance (e.g., 5 m) as illustrated in FIG. 11B, the terminal 100 determines a sound source-selection distance according to the received inputs. As illustrated in FIG. 11C, the terminal 100 displays a radius corresponding to the sound source-selection distance from the terminal 100. Upon receipt of a hold input maintained for a predetermined time on the circumference of a circle having the radius indicating the sound source-selection distance, successively to the flick input as illustrated in FIG. 11C, the terminal 100 determines the radius as the sound source-selection distance.

If the terminal 100 determines that the user gesture input indicates a sound-source distance at operation 840, then once the sound source-selection distance is determined, the terminal 100 proceeds to operation 842 at which the terminal 100 may select a sound source within the sound source-selection distance and output a sound of the selected sound source.

In contrast, if the terminal 100 determines that the user gesture input does not indicate a sound-source distance at operation 840, then the terminal 100 proceeds to operation 850 at which the terminal 100 determines whether the user gesture input indicates a sound source-selection position. For example, a user gesture input indicating a sound source-selection position may be a hold input at a specific point on the circumference of a circle having a radius defined by a flick input following a touch and hold input.

FIGS. 12A to 12D illustrate user gesture inputs indicating a sound source-selection position according to an embodiment of the present disclosure.

Figure 12A:
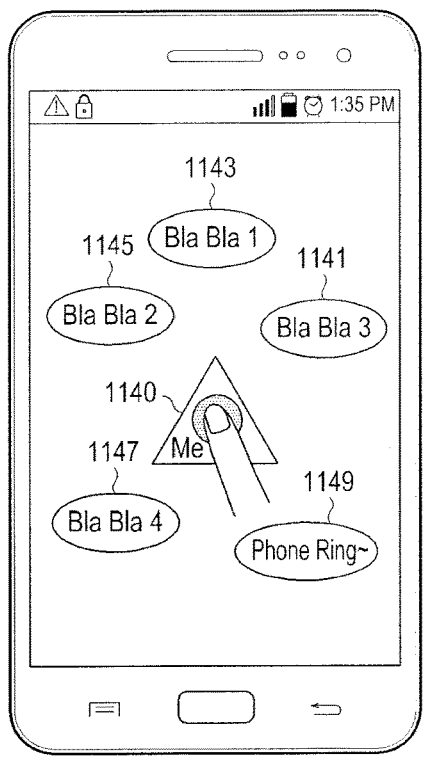
FIGS. 12A, 12B, 12C, and 12D illustrate user gesture inputs indicating a sound source-selection position according to an embodiment of the present disclosure.
Figure 12B:
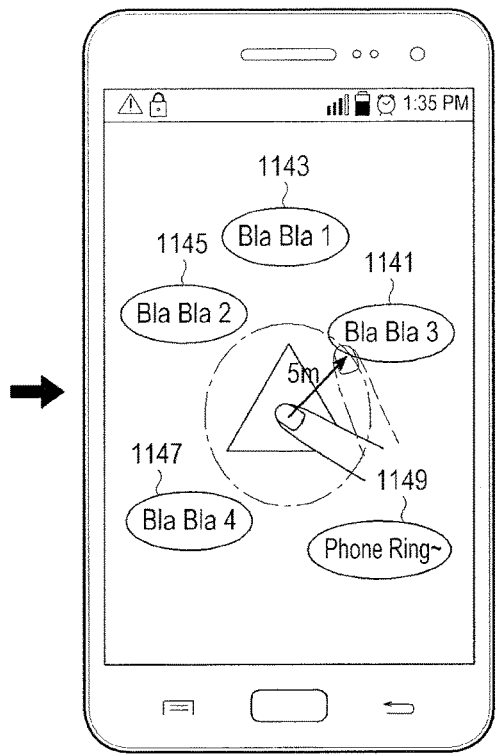
Figure 12C:
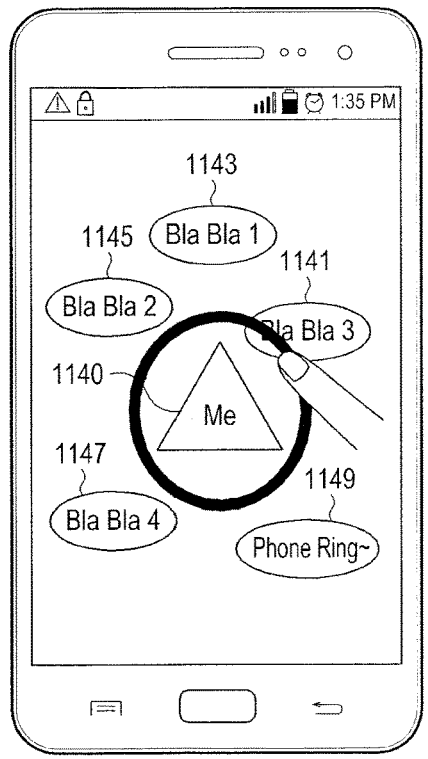
Figure 12D:
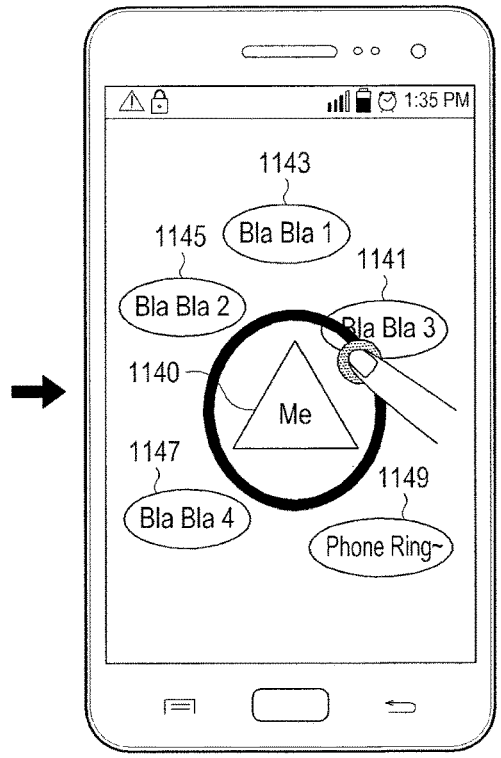

Referring to FIGS. 12A to 12D, while a terminal image 1140 representing the terminal 100 and sound source images 1141, 1143, 1145, 1147, and 1147 representing one or more sound sources around the terminal 100 are being displayed on a screen, upon receipt of a touch and hold input to the terminal image 1140 as illustrated in FIG. 12A and then a flick input corresponding to a specific distance (e.g., 5 m) as illustrated in FIG. 12B, the terminal 100 may display a radius corresponding to the sound source-selection distance from the terminal image 1140 as illustrated FIG. 12C. Upon receipt of a hold input maintained for a predetermined time on the circumference of a circle having the radius indicating the distance from the terminal 100, successively to the flick input as illustrated in FIG. 12D, the terminal 100 may determine a position on the circumference of the circle having the radius as a sound source-selection position.

Once the terminal 100 determines the sound source-selection position at operation 850, the terminal 100 proceeds to operation 852 at which the terminal 100 may select a sound source at the sound source-selection position and output a sound of the selected sound source.

According to various embodiments of the present disclosure as described above, the terminal 100 distinguishes adjacent sound sources around the terminal 100 and displays the sound sources separately. The terminal 100 may output a sound of a user-selected sound source or control the volume of the output sound.

The terminal 100 may receive sound signals of adjacent sound sources from the hearing aid 300 and display the sound sources. Upon user selection of a sound source, the terminal 100 may transmit a sound of the selected sound source to the hearing aid 300 so that the hearing aid 300 may output the sound of the selected sound source.

If a user selects a volume level for a sound of a sound source, then the terminal 100 transmits the sound of the sound source with a volume corresponding to the selected volume level to the hearing aid 300 so that the hearing aid 300 may output the volume-controlled sound of the sound source.

A description will be given of the configuration and operation of the hearing aid 300 according to an embodiment of the present disclosure.

Figure 13:
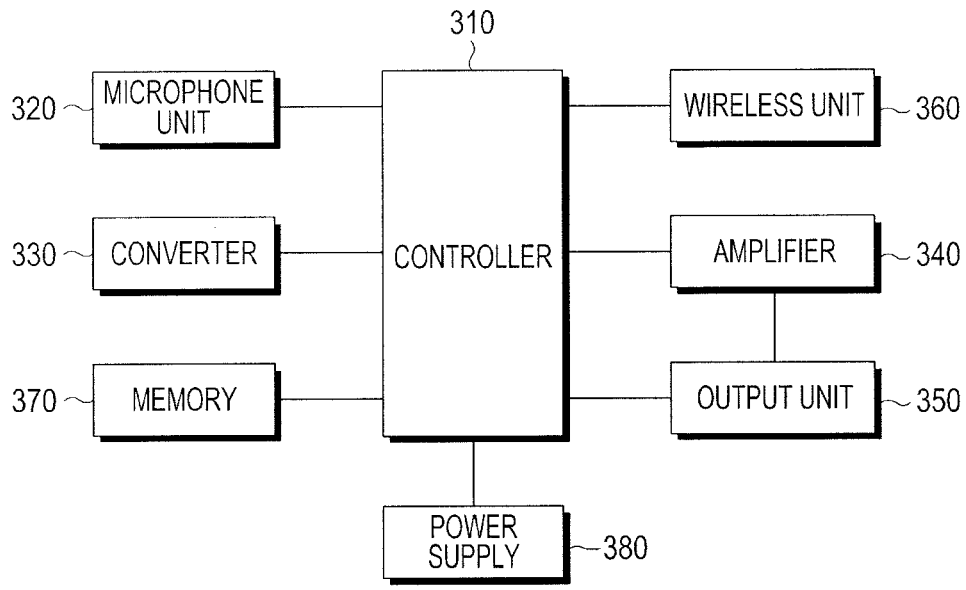
FIG. 13 is a block diagram of a hearing aid according to an embodiment of the present disclosure.

FIG. 13 is a block diagram of a hearing aid according to an embodiment of the present disclosure.

Referring to FIG. 13, the hearing aid 300 may include a hearing aid controller 310, a microphone unit 320, a converter 330, an amplifier 340, an output unit 350, a wireless unit 360, a memory 370, and a power supply 380.

The hearing aid controller 310 provides overall control to the hearing aid 300 and controls the operations of the microphone unit 320, the converter 330, the amplifier 340, the output unit 350, the wireless unit 360, the memory 370, and the power supply 380.

The microphone unit 320 may include at least two microphones and may detect and receive adjacent sounds. For example, the at least two microphones may be disposed outside the hearing aid 300, receive analog sound signals from adjacent sound sources, in an ear of a user, and transmit the analog sound signals to the converter 330 under the control of the hearing aid controller 310.

The converter 330 may convert the analog sound signals received from the microphone unit 320 to digital sound signals and may convert amplified digital sound signals to analog sound signals. For example, the converter 330 may convert an analog sound signal received from the microphone unit 320 to a digital sound signal and provide the digital sound signal to the hearing aid controller 310.

The hearing aid controller 310 performs digital signal processes on the digital sound signal received from the converter 330, such as unnecessary noise cancellation, feedback control, amplification gain control, non-linear amplification, and the like. Thereafter, the hearing aid controller 310 provides the processed digital sound signal to the converter 330.

The amplifier 340 amplifies the digital sound signal received from the converter 330 based on an amplification gain received from the hearing air controller 310 and provides the amplified sound signal to the hearing aid controller 310.

The converter 330 converts the processed digital sound signal received from the hearing aid controller 310 to an analog sound signal and provides the analog sound signal to the output unit 350.

The output unit 350 outputs the received analog sound signal.

The wireless unit 360 may include one of a mobile communication module (not shown), a WLAN module (not shown), a short-range communication module (not shown), and the like, and may communicate with the terminal 100 wirelessly. The short-range communication module may include an infrared communication module, a Bluetooth communication module, and/or the like. The wireless unit 360 communicates wirelessly with the terminal 100 under the control of the hearing aid controller 310. The wireless unit 360 receives a sound signal of a selected sound source or a volume-controlled sound signal of the selected sound source from the terminal 100, or transmits sound signals of sound sources collected through the microphone unit 320 to the terminal 100.

The memory 370 stores a sound signal of a selected sound source or a volume-controlled sound signal of the selected sound source, received from the terminal 100, or stores sound signals of sound sources collected through the microphone unit 320.

The power supply 380 supplies power to each component of the hearing aid 300.

According to various embodiments of the present disclosure, the hearing aid 300 configured as described above may receive sound signals of sound sources through the microphone unit 320 and transmit the received sound signals to the terminal 100. In addition, the hearing aid 300 may receive a sound signal of a user-selected sound source or a volume-controlled sound signal of the user-selected sound source from among sound signals of sound sources from the terminal 100 and output the received sound signal.

Figure 14:
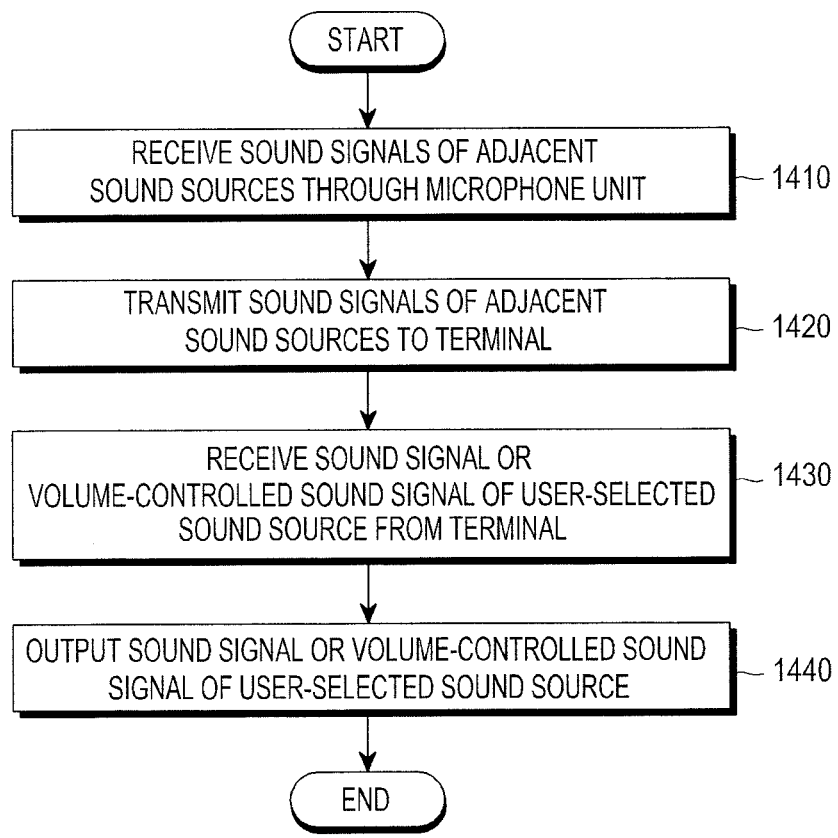
FIG. 14 is a flowchart illustrating an operation of a hearing aid according to an embodiment of the present disclosure.

FIG. 14 is a flowchart illustrating an operation of a hearing aid according to an embodiment of the present disclosure.

Referring to FIG. 14, at operation 1410, the hearing aid 300 may receive sound signals of adjacent sound sources through the microphone unit 320. Specifically, the hearing aid 300 may receive analog sound signals from adjacent sound sources through at least two microphones that may be disposed outside the hearing aid 300 in an ear of the user.

At operation 1420, the hearing aid 300 may transmit the received sound signals of the sound sources to the terminal 100. For example, the hearing aid 300 may communicate with the terminal 100 wirelessly through the wireless unit 360 and transmit the sound signals of the sound sources to the terminal 100 by wireless communication. The terminal 100 may receive the sound signals of the sound sources from the hearing aid 300, distinguish one or more sound sources based on the received sound signals of the sound sources, calculate the sound strength, direction, and distance of each sound source, and display the one or more sound sources on a screen of the terminal 100.

Upon user selection of a sound source from among the displayed sound sources, the terminal 100 may transmit a sound signal of the selected sound source to the hearing aid 300. Upon user selection of a volume level for the sound signal of the sound source, the terminal 100 may transmit the volume-controlled sound signal of the sound source to the hearing aid 300. According to various embodiments of the present disclosure, the terminal 100 may transmit a sound signal of the selected sound source to the hearing aid 300, and the terminal 100 may transmit an indication as to the selected volume level sound signal of the selected sound source.

At operation 1430, the hearing aid 300 may receive a sound signal or volume-controlled sound signal of a selected sound source from the terminal 100 through the wireless unit 360.

At operation 1440, the hearing aid 300 outputs the received sound signal or volume-controlled sound signal of the selected sound source to the output unit 350.

While it has been described above that the hearing aid 300 transmits sound signals of sound sources received through the microphone unit 320 to the terminal 100, the hearing aid 300 may receive from the terminal 100 a sound signal or volume-controlled sound signal of a selected sound source that the terminal 100 has received through the first to nth microphones 162-1 to 162-n, and then output the received sound signal, instead of transmitting sound signals of sound sources received through the microphone unit 320 to the terminal 100 through the wireless unit 360.

As is apparent from the above description of the various embodiments of the present disclosure, a user can locate sound sources around the user using the display of the terminal 100.

According to various embodiments of the present disclosure, the user may (selectively) hear only the sound of an intended sound source selected from among the sound sources and control the volume of the sound stepwise.

According to various embodiments of the present disclosure, if a person suffering from poor hearing uses the hearing aid 300, the person can locate sound sources through the terminal 100 that operates in conjunction with the hearing aid 300 and hear the sound of an intended sound source through the hearing aid 300.

Because the user can hear the sound of an intended sound source by various gestures, a convenient UI is provided to the user.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the non-transitory processor readable mediums include Read-Only Memory (ROM), Random-Access Memory (RAM), CD-ROMs, magnetic tapes, floppy disks, and optical data storage devices. The non-transitory processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains While the present disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An portable terminal comprising:
    a touch screen;
    at least two microphones;
    one or more processors; and
    a memory comprising instructions that, when executed by the one or more processors, cause the portable terminal to:
        receive a plurality of sound signals including a first sound signal and a second sound signal via the at least two microphones,
        present a plurality of indications including a first indication, indicating a first sound source corresponding to a first sound signal received via the at least two microphones, at a first position of the touch screen, and a second indication, indicating a second sound source corresponding to a second sound signal received via the at least two microphones, at a second position of the touch screen, and a movable element positioned at a center in relation with the plurality of indications,
        receive, on the touch screen, a touch input on the movable element,
        receive, on the touch screen, a drag input from the movable element toward one of the first indication and the second indication, and
        output a sound corresponding to the drag input, based on the plurality of sound signals.

2. The portable terminal of claim 1, wherein the sound is provided to an ear-microphone and output via the ear-microphone.

3. The portable terminal of claim 1, wherein the instructions further comprise instructions to cause the portable terminal to:
    change a graphic user interface of a corresponding one of the first indication and the second indication based at least in part on a user input.

4. The portable terminal of claim 1, wherein an indication corresponding to the output sound is displayed in a different manner from the other indications.

5. The portable terminal of claim 4, wherein a volume of the output sound is adjusted based on a second input.

6. The portable terminal of claim 4, further comprising:
a communication module,
wherein the output sound is transmitted, via the communication module, to an external electronic device.

7. The portable terminal of claim 5, wherein the instructions further comprise instructions to cause the portable terminal to:
mute the output sound,
increase a first output sound corresponding to the first sound source compared to a second output sound corresponding to the second sound source, and
decrease the first output sound corresponding to the first sound source compared to the second output sound corresponding to the second sound source.

8. The portable terminal of claim 1, wherein the output sound is discontinued if the indication corresponding the output sound is touched.

9. The portable terminal of claim 1, wherein at least one of a size, a type, or a name of the first indication is different from a corresponding one of a size, a type, or a name of the second indication based at least in part on the first position information and the second position information.

10. The portable terminal of claim 1, wherein the movable element represents a relative position of the portable terminal with respect to the first sound source and the second sound source.

11. The portable terminal of claim 1, wherein the instructions further comprise instructions to cause the portable terminal to:
determine a direction corresponding to the drag input, and
output the sound corresponding to the direction based on the plurality of sound signals.

12. The portable terminal of claim 1, wherein the instructions further comprise instructions to cause the portable terminal to:
determine a first direction to the first sound source from the portable terminal and a second direction to the second sound source from the portable terminal, and
present the first indication indicating the first sound source at the first position of the touch screen based on the first direction and the second indication indicating the second sound source at the second position of the touch screen based on the second direction.

13. The portable terminal of claim 1, wherein the instructions further comprise instructions to cause the portable terminal to:
obtain frequency component of the first sound signal and the second sound signal, and
obtain type of the first sound signal and type of the second sound signal based on the frequency component.

14. The portable terminal of claim 1, wherein the instructions further comprise instructions to cause the portable terminal to:
output the sound including a first output sound corresponding to the first sound source and a second output sound corresponding to the second sound source.

15. The portable terminal of claim 1, wherein the instructions further comprise instructions to cause the portable terminal to:
display a circle, the positioned third indication being within the circle, and
output the sound corresponding to an indication positioned on the circle.

16. A portable terminal comprising:
a touch screen;
at least two microphones; and
one or more processors configured to:
present a first indication indicating a first sound source outside of the portable terminal corresponding to a first sound signal received via the at least two microphones at a first position of the touch screen, a second indication, indicating a second sound source outside of the portable terminal corresponding to a second sound signal received via the at least two microphones, at a second position of the touch screen, and a third indication, indicating a third sound source outside of the portable terminal corresponding to a third sound signal received via the at least two microphones, wherein the first, second and third indications are arranged in a radial direction from a central indication on the display,
receive, on the touch screen, a drag input with respect to the central indication toward one of the first, second, and third indications, and
output a sound corresponding to the drag input, based on a first sound signal received from the first sound source via the at least two microphones, a second sound signal received from the second sound source via the at least two microphones, and a third sound signal received from the third sound source via the at least two microphones.

* * * * *